United States Patent [19]

Malik et al.

[11] Patent Number: 4,683,074

[45] Date of Patent: Jul. 28, 1987

[54] STABILITY AND COMPATIBILITY OF GLYCOSIDES IN ACID SYSTEMS

[75] Inventors: Arshad H. Malik; Allen D. Urfer, both of Decatur, Ill.

[73] Assignee: A. E. Staley Manufacturing Company, Decatur, Ill.

[21] Appl. No.: 727,647

[22] Filed: Apr. 26, 1985

[51] Int. Cl.$^4$ .......................... C11D 1/66; C11D 7/08; C23G 1/04; C23G 1/12

[52] U.S. Cl. ........................................ 252/136; 134/3; 134/40; 134/41; 252/142; 252/146; 252/174.17; 252/DIG. 14

[58] Field of Search .................. 252/174.17, 142, 136, 252/146

[56] References Cited

U.S. PATENT DOCUMENTS

| | | | |
|---|---|---|---|
| 2,977,315 | 3/1961 | Scheib | 252/106 |
| 3,640,998 | 2/1972 | Mansfield | 536/18.3 |
| 3,793,221 | 2/1974 | Otrhalek | 252/136 |
| 4,154,706 | 5/1979 | Kenkare | 252/547 |
| 4,359,391 | 11/1982 | Salathiel | 252/8.55 C |
| 4,404,040 | 9/1983 | Wang | 252/142 |
| 4,483,780 | 11/1984 | Llenado | 252/135 |
| 4,528,106 | 7/1985 | Grolitzer | 252/8.55 D |
| 4,536,318 | 8/1985 | Cook | 252/174.17 |

OTHER PUBLICATIONS

"Triton GB-10", Rohm & Haas publication CS-449, published Nov. 1979, 10 pages.
"Dowfax Surfactants", 1982, published by The Dow Chemical Co., 20 pages.

*Primary Examiner*—Dennis L. Albrecht
*Attorney, Agent, or Firm*—Michael F. Campbell; James B. Guffey; J. Daniel Wood

[57] ABSTRACT

The glycoside surfactants are employed in combination with strong acids to provide cleaning and acidizing compositions.

1 Claim, No Drawings

STABILITY AND COMPATIBILITY OF GLYCOSIDES IN ACID SYSTEMS

BACKGROUND OF THE INVENTION

1. Field of the Invention

This invention describes acid stable surfactant materials.

2. Description of the Art

Ordinarily surfactant compositions are formulated at an alkaline pH. Thus most laundry products or bottle cleaning formulations have an in-use pH of from about 8 to about 12. It is however, desirable when formulating certain hard surface cleaning compositions to utilize a high acid content such as a pH of 2 or less.

The highly acid cleaning compositions are often used where there are salt deposits such as from milk acids (milkstone), or calcium or magnesium carbonate deposites such as in toilets or in equipment in which relatively hard wataer is utilized. Iron salts are also ordinarily removed with acid cleaning compositions.

Conventional surfactants for cleaning hard surfaces are described in U.S. Pat. No. 3,591,510 to Zenk issued July 6, 1971. An article entitled *A Greasy Soiled Hard Surface Cleaning Test* by Morris A. Johnson, JAOCS, Volume 61, No. 4, pages 810–813 (April 1984), describes a series of commercially available solvent-based and water-based cleaners useful for removing greasy soil. Further disclosures of hard surface cleaning formulations are also discussed in *Formulation of Hard Surface Spray Cleaners* by Johnson et al as reported in *detergents and specialties*, June 1969, pages 28–32 and 56.

Uses and combinations of glycosides are disclosed in Rohm and Haas publications CS-400 and CS-449 dated January 1978 and November 1979 respectively.

It is also known that oil wells are advantageously acidized to open the rock formations to allow free drainage of oil into a sump from which it is more easily pumped. In such formulations, it is desirable that a surfactant be included to assist in carrying the dissolved rock. This may be accomplished through a surfactants' foam forming ability. It is also desirable in the acid treatment of oil bearing strata to have the surfactant foam sufficiently to fracture the rock. The surfactant desirably loses its foaming capacity following acidization or fractionation in that the foam would inhibit the flow of the oil through the formation which is contrary to the stated purpose of providing free flow of the oil.

It is known from Arnaudis in European Published Application No. 0077167 dated Apr. 20, 1983 that strong acids in combination with reducing acids may be used to prepare glycosides. Urfer, in U.S. patent application Ser. No. 06/668,762 filed Nov. 6, 1984 discloses weak buffering acids in combination with glycosides.

It has now been found that glycoside surfactants of the type described herein have excellent stability under highly acid conditions. The glycosides which are excellent surfactant materials provide sufficient foaming in hard surface cleaners so that the remainder of the composition e.g., acid, does not merely run off of the surface being cleaned. It is also observed that the glycoside surfactant is one which is stable but which eventually will cease foaming, therefore making it an excellent acidizing or fracturing surfactant.

Throughout the specification and claims, percentages and ratios are by weight, temperatures are in degrees of Celsius and pressures are in KPascals over-ambient unless otherwise indicated. To the extent that the references cited herein are applicable to the present invention, they are incorporated herein by reference.

SUMMARY OF THE INVENTION

The present invention describes a composition comprising:
- (a) from about 1% to about 70% by weight of a monoglycoside;
- (b) from about 1% to about 70% by weight of a polyglycoside; and
- (c) from about 5% to about 75% by weight of an acid having a $K_1$ of $2.5 \times 10^{-4}$ or greater.

A further embodiment of the present invention is a composition comprising:
- (a) a member selected from the group consisting of:
  - (i) from about 1% to about 70% by weight of a monoglycoside; and
  - (ii) from about 1% to about 70% by weight of a polyglycoside; and,
  - (iii) mixtures of (i) and (ii);
- (b) from about 5% to about 75% by weight of an acid having a $K_1$ of $2.5 \times 10^{-4}$ or greater.

DETAILED DESCRIPTION OF THE INVENTION

The glycosides with which the present invention is concerned are typically represented by the formula:

$$R(OG)_x$$

where R is an organic hydrophobic moiety conveniently containing from about 6 to about 30; preferably 6 to 24; more preferably 8 to 20; and most preferably 9 to 18 carbon atoms. The organic hydrophobic moiety may be alkyl, alkylphenol, alkylbenzyl, hydroxyalkyl alkylphenol, hydroxyalkyl and the like.

The hydrophobic moiety may also include an alkoxy group therein such that the value R may be formulated from an alcohol which has been alkoxylated thereby providing an alkoxy group between the glycoside and the hydrophobic moiety. In the formula given above, O is stated to be an oxygen atom and provides the linkage (ordinarily formed through an acetal mechanism) between the hydrophobic moiety and the saccharide (G).

Typical saccharides employed herein are fructose, glucose, mannose, galactose, talose, gulose, allose, altrose, idose, arabinose, xylose, lyxose and ribose and mixtures thereof. Preferably, the glycoside is formed from glucose units. It is further noted within the description given in the Summary that the respective monoglycoside component need not necessarily be the same as the polyglycoside component. Therefore, it is possible that the monoglycoside is based upon glucose whereas the polyglycoside may be a xyloside-based glycoside. Preferably, both the monoglycoside (a) and the polyglycoside (b) are both glucose-based. The saccharide units within the polyglycoside may also be mixed such as using fructose and glucose to give sucrosyl structure. The glycoside, whether mono or poly or mixed, is added in a sufficient amount to reduce the surface tension of the acid.

The value x given in the formula indicates the degree of polymerization (DP) which is stated to be the average value of the saccharide units within the glycoside. Thus a polyglucoside having a DP of 2 (x=2) indicates that the polyglycoside contains two glucose units. More specifically, the value of x will vary between about 1.1 and about 8; typically from about 1.2 to about 5, and most preferably from about 1.4 to about 3.

The unmodified glycosides utilized herein may be prepared according to the process described in U.S. Pat. No. 4,223,129 issued Sept. 6, 1980 to Roth et al. Alternatively, the glycosides may be prepared by the route of Mansfield, U.S. Pat. No. 3,839,318 issued Oct. 1, 1974. A further disclosure of preparing a glycoside is found in U.S. Pat. No. 3,219,656 issued to Boettner et al on Nov. 23, 1965.

Modified glycosides which are utilized herein contain alkoxy groups pendant from the saccharide. The preparation of such materials is generally described in U.S. Pat. No. 3,640,998 to Mansfield issued Feb. 8, 1972 and herein incorporated by reference. The alkoxylated glycosides of Roth and Moser described in a U.S. Application Ser. No. 06/704,828 filed Feb. 22, 1985 are also useful herein.

The acids utilized in the present invention are typically strong acids including sulfuric, hydrochloric, gluconic, nitric, sulfamic, oxalic, phosphoric, phosphorous or any other strong acid. The acid should have a dissociation constant at $K_1$ at 25° C. of equal to or greater than $2.5 \times 10^{-4}$; preferably equal to or greater than $1 \times 10^{-4}$; more preferably equal to or greater than $5 \times 10^{-3}$; most preferably $1 \times 10^{-3}$ or greater. The acid employed at 0.1N in distilled water at 25° C. should give a pH of 1.8 or less; preferably 1.6 or less.

While other weaker acids may be employed these materials are not favored for the highly acid conditions normally encountered in acidizing oil-bearing strata or for the cleaning of toilet bowls or milk (food) processing equipment.

The amount of monoglycoside utilized in the present composition is conveniently from about 1% to about 70% by weight; preferably from about 3% to about 55% by weight; and most preferably from about 5% to about 45% by weight.

The amount of polyglycoside employed herein is conveniently from about 1% to about 70% by weight; typically from about 3% to about 55% by weight; and most preferably from about 5% to about 45% by weight. The ratio of monoglycoside to polyglycoside is preferably from 20:1 to 1:20 to ensure proper cleaning effect.

The acid utilized herein is typically employed in the composition at from about 5% to about 70% by weight of the actual acid species e.g., 37% hydrochloric acid is expressed as a 100% HCl basis. Thus the amount of acid utilized is conveniently from about 6% to about 50%; and most preferably from about 8% to about 45% by weight.

As previously noted, the glycosides are typically obtained from the processes of the references cited herein. The desired average degree of polymerization of the total glycoside present may be obtained by preparing a single mixture of glycoside and polyglycoside. Alternatively, separate glycosides may be obtained and thereafter formulating the product to obtain the desired DP.

The acid and the glycoside may be mixed to the desired proportions in any convenient manner. It is also contemplated herein that when using the acidizing or fracturing aspect of the present invention that the glycoside surfactant and the acid be mixed at the well site. It is desired that when mixing the glycoside and the acid, that a minimal amount of agitation be employed as this tends to cause the glycoside to foam which is not particularly desirably. As the glycoside and the acid are both compatible liquid materials, it is possible to form a simple mixture or upon careful agitation to obtain a true solution of the glycoside and acid.

As most of the acids employed herein are obtained in their concentrated aqueous form, it is a further desirable variable herein that water be included within the composition. The amount of water employed herein is typically from about 10% to about 95%; and preferably from about 15% to about 75%.

Other materials which may be incorporated within the compositions herein include, depending upon the use employed, an anionic surfactant such as an alkylsulfate, paraffin sulfate, paraffin sulfonate, olefin sulfonate, alkylether sulfate, or an alkylbenzene sulfonate. These anionic surfactants are typically found in the form of their soidum, potassium or ammonium salt, however, it is noted herein that due to the high degree of acidity in the present compositions that the anionic surfactants will typically be in their acid form to a substantial degree notwithstanding the cationic salt species employed.

Amines may be included herein at from 0% to 50% by weight to lessen acid etching of metal surfaces. Preferably, the amines will be a nonaromatic material. The amine should be used at less than a 10:1 ratio to the glycoside. Quaternary compounds may be included to provide disinfectant effect.

Additional ingredients which may be employed herein are materials such as detergent builders and abrasive materials. Certain abrasive materials, such as calcium carbonate, would tend to dissolve and liberate carbon dioxide. Thus it is more preferred that a material such as a silica be employed as the abrasive to avoid having the abrasive material decompose upon storage. The amount of detergent builder or abrasive which may included in the compositions of the present invention is typically from about 2% to about 40%; typically from about 3% to about 30% by weight. Suitable builders include the phosphates, NTA, aluminosilicates and the builders of Valenty disclosed in U.S. applications, Ser. Nos. 06/575,421 and 06/664,451 filed Jan. 31, 1984 and Oct. 23, 1985 respectively.

EXAMPLE I

The following compositions are prepared by obtaining a glycoside of the average degree of polymerization (DP) and having an alkyl chain length shown as carbon chain. The acids are presented on an active "solids" basis.

| | STABILITY OF GLUCOSIDE IN ACID MEDIUM | | | | | |
|---|---|---|---|---|---|---|
| | CARBON CHAIN | DP | % GLUCOSIDE | % ACID | SURFACE TENSIONS (25° C.) INITIAL DYNES/CM | SURFACE TENSION (25° C.) (AFTER 7 DAYS AT 49° C.) DYNES/CM |
| 1. | *91 | 3.0 | 1.0 | 10% HCl | 27.5 | 23.7 |

-continued
STABILITY OF GLUCOSIDE IN ACID MEDIUM

| | CARBON CHAIN | DP | % GLUCOSIDE | % ACID | SURFACE TENSIONS (25° C.) INITIAL DYNES/CM | SURFACE TENSION (25° C.) (AFTER 7 DAYS AT 49° C.) DYNES/CM |
|---|---|---|---|---|---|---|
| 2. | 91 | 3.0 | 1.0 | 5% HCl | 27.2 | 25.4 |
| 3. | **23 | 3.0 | 0.1 | 10% HCl | 27.3 | 23.5 |
| 4. | 23 | 3.0 | 0.01 | 10% HCl | 29.5 | 29.0 |
| 5. | 23 | 3.0 | 1.0 | 20% HCl | 27.3 | 23.4 |
| 6. | 23 | 3.0 | 1.0 | 20% H2SO4 | 27.4 | 25.4 |
| 7. | 23 | 3.0 | 0.1 | 10% H2SO4 | 27.4 | 25.6 |
| 8. | 23 | 3.0 | 1.0 | 40% H3PO4 | 27.8 | 26.7 |
| 9. | 23 | 3.0 | 0.1 | 40% H3PO4 | 29.1 | 21.0 |

*91 is a mixture of nonyl, decyl and undecyl.
**23 is a mixture of dodecyl and tridecyl.

EXAMPLE II

Aluminum Brighteners and Cleaners

LIQUID ALUMINUM BRIGHTENER (ACID/GLYCOL ETHER/SURFACTANT/SOLVENT)

| Raw Materials | Percent by Weight |
|---|---|
| 1. Water | 12 |
| 2. Phosphoric Acid (85%) | 49 |
| 3. DP 3 glucoside | 10 |
| 4. Dowanol DPM Glycol Ether | 25 |
| 5. Orhto-dichlorobenzene | 4 |
| | 100 |

EXAMPLE III

Household, Automotive, and Industrial Chemical Formulations

LIQUID ALUMINUM CLEANER (ACIDS/NITRATE/SURFACTANT)

| Raw Materials | Percent by Weight |
|---|---|
| 1. Phosphoric Acid (85%) | 12.0 |
| 2. Oxalic Acid | 3.0 |
| 3. Sodium Nitrate | 8.0 |
| 4. DP 2.2 glucoside | 3.0 |
| 5. Water | 74.0 |
| | 100.0 |

EXAMPLE IV

Dairy Cleaners

LIQUID DAIRY CLEANER (ACIDS/SURFATROPE)

| Raw Materials | Percent by Weight |
|---|---|
| 1. Water | 45 |
| 2. Phosphoric Acid (85%) | 36 |
| 3. Hydrochloric Acid (20° Be) | 17 |
| 4. DP 1.5 glucoside | 2 |
| | 100 |

Formulation Notes
1. Use at 4–12% in diluting out depending on scale.
Key Property
Acid milkstone remover.

EXAMPLE V

LIQUID LIGHT DUTY ACID-TYPE DAIRY CLEANER (ACID/SURFACTANT)

| Raw Materials | Percent by Weight |
|---|---|
| 1. Gluconic Acid Solution (50%) | 20.0 |
| 2. DP 2.2 glucoside | 10.0 |
| 3. Water | 70.0 |
| | 100.0 |

Key Properties
Excellent soil-removal qualities.
Good compatibility.
High level of detergency (including degreasing ability) and dispersibility.
Good hydrotopic properties.

EXAMPLE VI

POWDERED CLEANING COMPOUND (ACID/SULFATE/SURFATROPE)

| Raw Materials | Percent by Weight |
|---|---|
| 1. DP 1.8 glucoside/xyloside mixture | 3 |
| 2. Sulfamic Acid | 50 |
| 3. Sodium Sulfate | 47 |
| | 100 |

Key Properties
Recommended for dairy use (removal of milk stone) and metal brightening.
Good, efficient formula.
Acid type for dairy use and metal brightening.

EXAMPLE VII

LIQUID ACID BOWL PORCELAIN CLEANER (ACID/SURFATROPE)

| Raw Materials | Percent by Weight |
|---|---|
| 1. Water | 90.0 |
| 2. Hydrochloric Acid | 8.0 |
| 3. DP 2.2 glucoside | 2.0 |
| | 100.0 |

Formulation Notes
1. After proper mixing, material may be dyed and perfumed.
2. For removal of iron stains from porcelain, squirt or apply directly. Let set for 3–5 minutes. Then scrub and rinse. For lighter stains or general use, dilute 1:1 with water.
3. Handle with care-always use with rubber gloves.

EXAMPLE VIII

LIQUID ACID BOWL TOILET CLEANER (ACID/SURFATROPE/POLYMER)

| Raw Materials | Percent by Weight |
|---|---|
| 1. Water | 71.0 |

-continued

| LIQUID ACID BOWL TOILET CLEANER (ACID/SURFATROPE/POLYMER) | |
| --- | --- |
| Raw Materials | Percent by Weight |
| 2. Hydrochloric Acid (20° Be) | 28.0 |
| 3. Morton E-153 Polymer Emulsion | 0.5 |
| 4. DP 2.4 glucoside | 0.5 |
| | 100.0 |

What is claimed is:

1. An aqueous composition having a pH of 2 or less, the composition consisting of about 12.0 weight percent of an 85.0 weight percent aqueous solution phosphoric acid, about 3.0 weight percent oxalic acid, about 8.0 weight percent sodium nitrate, about 3.0 weight percent of an alkyl glucoside and about 74.0 weight percent water, the glucoside having a degree of polymerization of about 2.2, the alkyl glucoside having an alkyl group selected from the group consisting of nonyl, decyl, undecyl, dodecyl, tridecyl or mixtures thereof, the phosphoric acid, the oxalic acid, the sodium nitrate and alkyl glucoside dissolved in the water.

* * * * *